Feb. 2, 1960  F. TAYLOR, JR., ET AL  2,923,603
COMBUSTIBLE GAS OR VAPOR DETECTORS
Filed Nov. 5, 1957  4 Sheets-Sheet 2

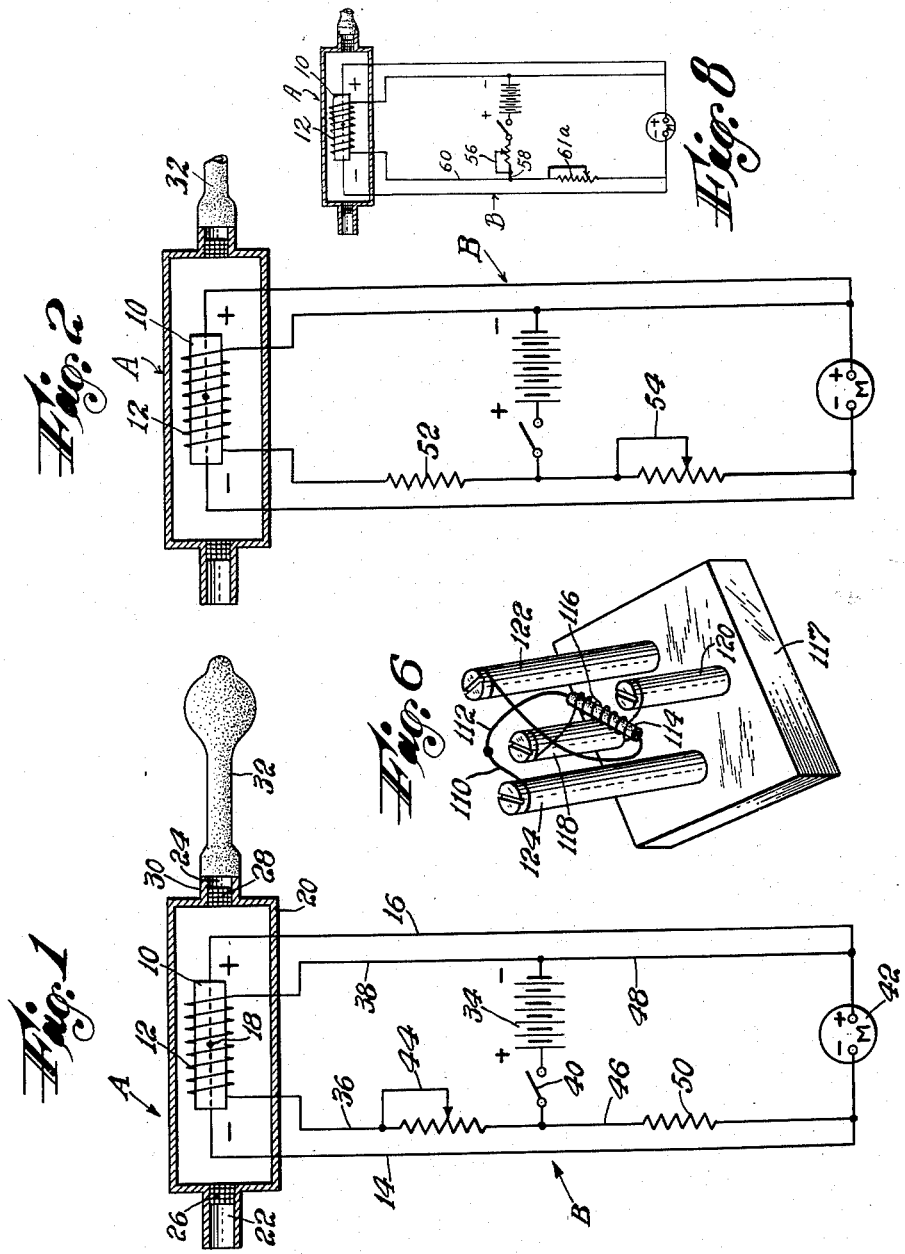

INVENTORS.
Fielding Taylor, Jr.
BY Matthew J. Schaeffer

Harry B. Rook
ATTORNEY

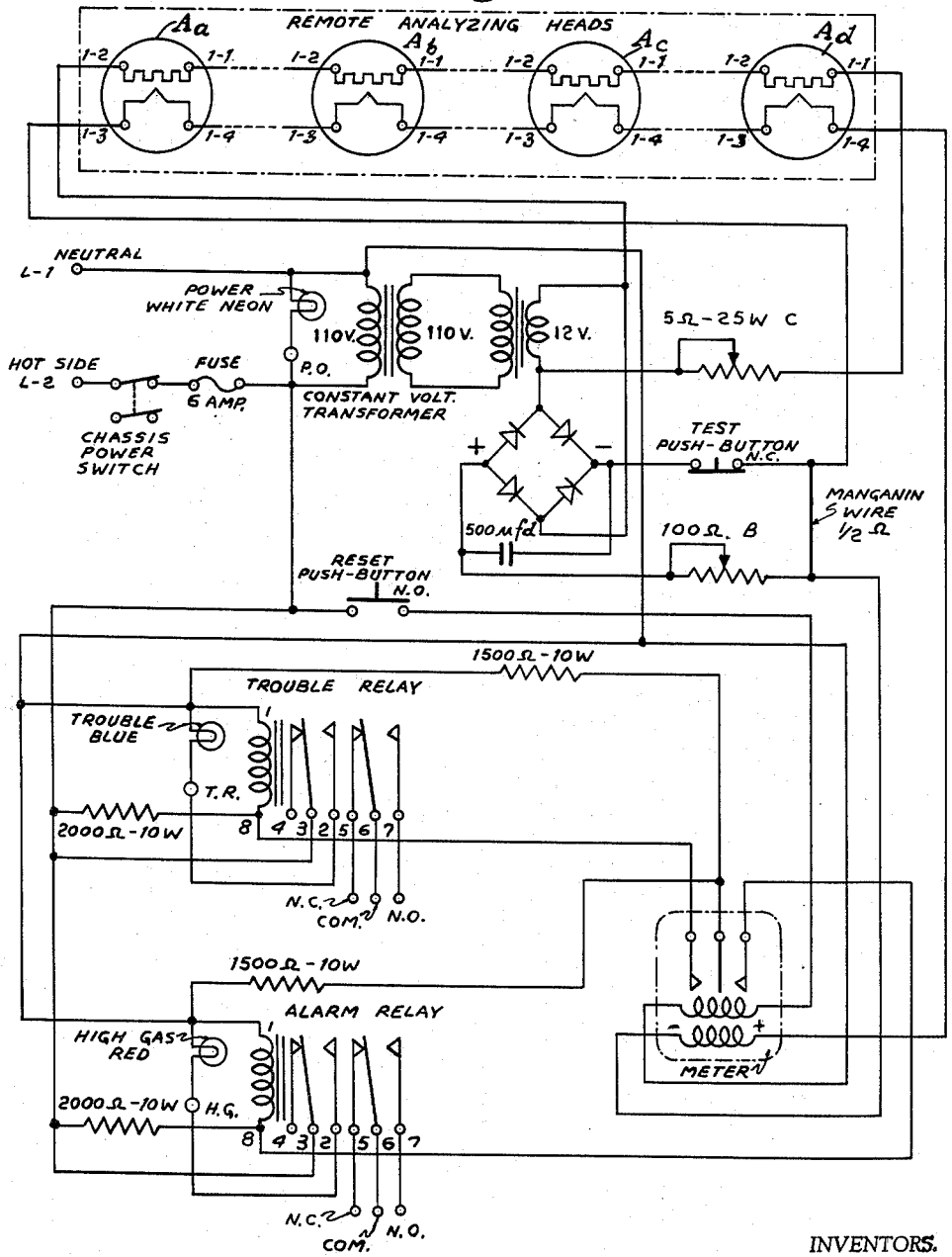

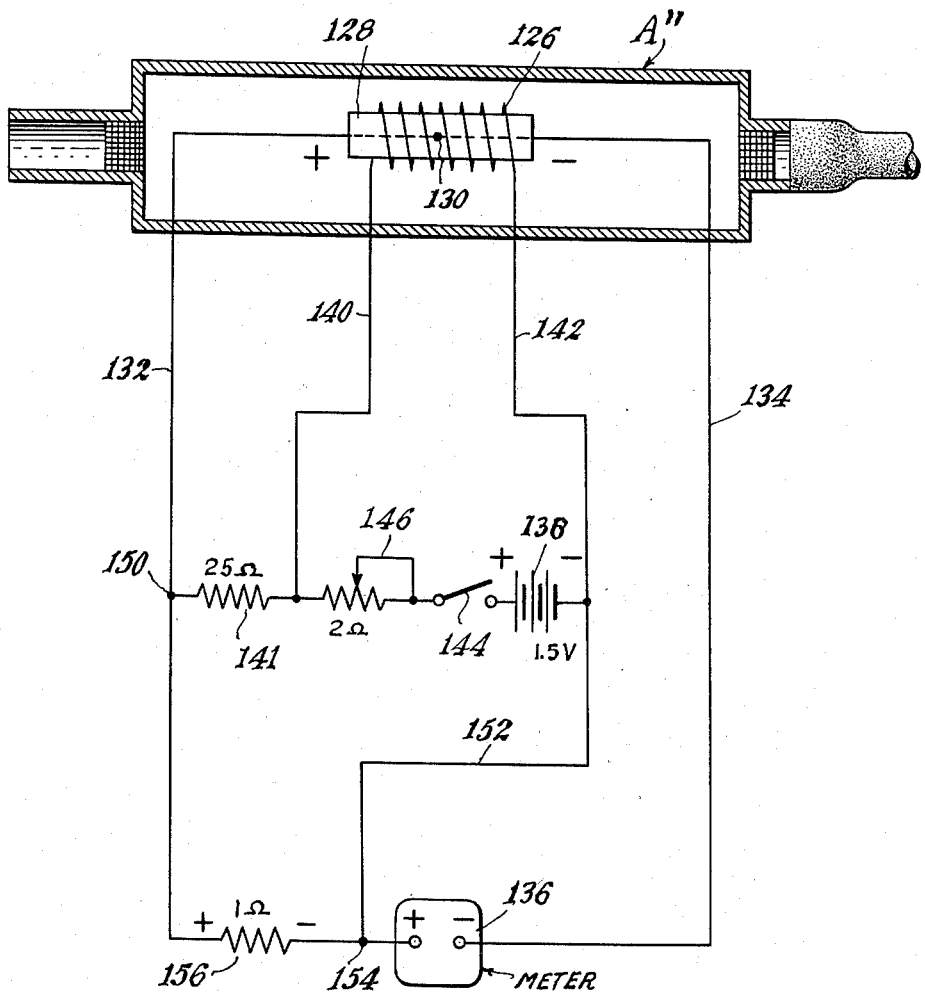

—

United States Patent Office 2,923,603
Patented Feb. 2, 1960

2,923,603

COMBUSTIBLE GAS OR VAPOR DETECTORS

Fielding Taylor, Jr., Upper Montclair, and Matthew J. Schaeffer, East Orange, N.J., assignors to Davis Emergency Equipment Co., Inc., Newark, N.J., a corporation of New York Application November 5, 1957, Serial No. 694,609

15 Claims. (Cl. 23—255)

The invention relates to the detection of combustible gases or vapors and the measurement of their amounts or concentrations to indicate whether a dangerous or explosive mixture is present.

One type of instrument which has been used to detect and indicate the presence of a flammable or combustible gas mixture comprises a Wheatstone bridge having a galvanometer connected across it, a "hot" catalytic wire or filament, such as platinum, being used as one leg of the bridge circuit. The catalytic filament is disposed in a location where the presence of a combustible gas is suspected, and by balancing the bridge circuit, with the galvanometer suitably calibrated, the presence of a combustible mixture may be detected and measurably indicated.

In an instrument of this type, it is necessary, for reliable indication, to make frequent corrections to "zero-in" the instrument. The high initial or activating temperature at which the catalytic filament must operate, and the even higher temperature which the filament must attain when a combustible gas burns on its surface, cause the filament material to volatilize. Such volatilization or deterioration changes the cross-sectional area of the filament, and therefore its resistance, thereby unbalancing the bridge circuit and necessitating frequent adjustments of the instrument.

In another type of gas detection and indicating instrument, a temperature sensitive element, such as a thermocouple, is disposed in close proximity or contact with a catalytic filament or mass, the thermocouple being connected to suitable means for measuring current or voltage to indicate the increase in temperature at the catalyst due to the burning of the combustible mixture on the surface thereof. In one form of this type of instrument, two thermocouples are employed, one in heat exchange relation with the catalytic mass and the other related to a non-catalytic mass maintained at the same initial or activating temperature so that a differential and resulting zero reading on the measuring means or meter may be obtained prior to measuring the degree of combustion. Such two thermocouple type of instrument requires frequent adjustment to match the temperatures for the catalytic and non-catalytic masses, and, in addition, provides an unduly complicated circuit.

In another form of such type instrument a single temperature sensitive element or a thermocouple is used, and requires that the measuring meter be "mechanically bucked" to obtain a zero reading on the meter prior to measuring the degree of burning increase at the catalyst. The catalyst must be initially and continuously heated to obtain maximum efficiency, and to prevent "poisoning" due to the presence of water vapor, carbon monoxide, etc., which are normally present in some measure in the atmosphere. Such initial heating or activation causes a deflection of the meter for which compensation must be made, and hence the resort to mechanically bucking of the meter for the initial output of the thermocouple. A sensitive meter may be mechanically bucked or unbalanced to only a limited degree, generally to a point not exceeding 65% of the meter's full scale sensitivity. When it is considered that most catalysts must be operated at a selected temperature between approximately 600 to 1000° F. during activation, and that further temperature increase due to the burning of the combustible gas on the catalyst may only be on the order of about another 100 to 200° F., it will be apparent that such mechanical adjustment and upsetting of the meter is not likely to furnish accurate indicating results through the desired operating range.

The present invention relates to instruments of the latter type which utilize a temperature sensitive element in heat exchange relationship with the catalyst together with means for measuring current or voltage connected to the temperature sensitive element to indicate an increase of temperature at the catalyst. An object of the invention is to provide an instrument of the type under consideration with means which affords a continuing balanced condition of the measuring and indicating means to compensate for the initial or activating temperature at the catalyst without, however, upsetting the mechanical balance of the measuring and indicating means.

A more specific object of the invention is to relate the output of a thermocouple in a gas detection and indicating instrument to the same power supply which furnishes the energy to heat the catalyst, and with which the thermocouple is in heat exchange relationship, so that the initial or activating temperature at the catalyst is electrically balanced at the means for measuring and indicating the degree of combustion to thereby afford a continuing true and accurate indication of temperature rise at the catalyst.

The invention is applicable to portable equipment or to a permanent installation where detection and indication is conducted on a continuous monitoring basis. The apparatus of the invention is suitable for sampling or testing for combustible gas or vapor mixtures in a wide variety of locations including manholes, storage tanks, cellars, vaults, bilges, or anywhere else where the presence of combustible gases or vapors may be suspected to exist.

These, and other objects and advantages of the invention will be apparent from the following detailed description taken in conjunction with the drawings illustrating several preferred embodiments of the invention, in which:

Fig. 1 is a wiring diagram, partly in section, showing one form of a portable instrument embodying the invention;

Fig. 2 is a view similar to Fig. 1 showing another form of the invention;

Fig. 5 is a wiring diagram similar to Fig. 4, except that the continuous monitoring system for detection and indication includes a plurality of detecting heads operated from a single source of power;

Fig. 6 is a perspective view of a mounting which may be used conjointly with any of the forms of the invention previously illustrated, and the form shown in Fig. 7, to compensate for variations in ambient temperature;

Figure 4:
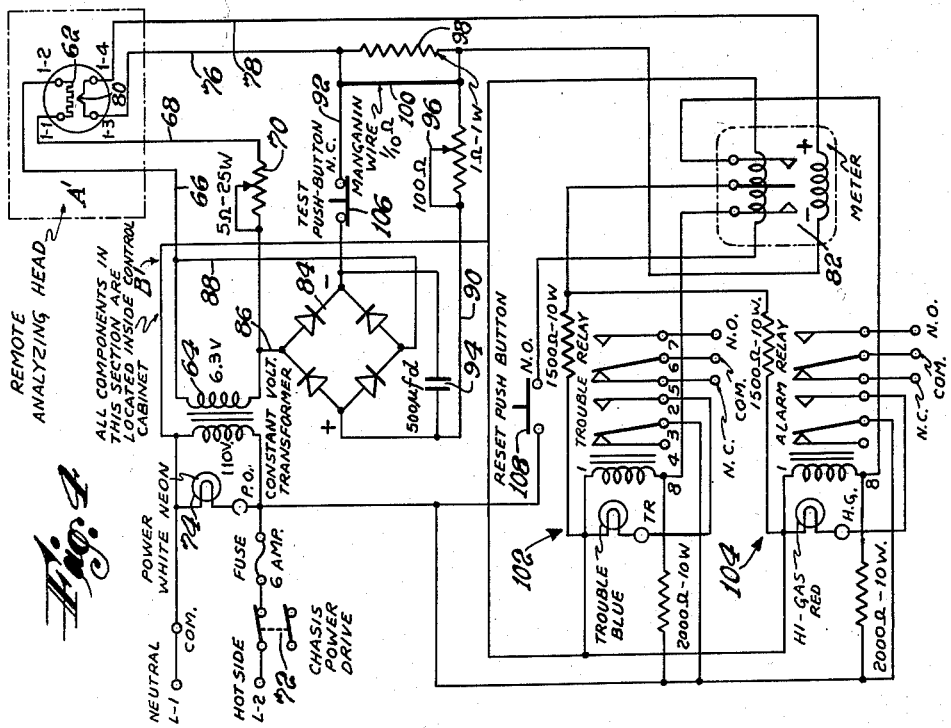
Fig. 4 is a wiring diagram illustrating a form of the invention which is particularly suitable for continuous detection and indication, this form of the invention showing a single detecting head, and providing visual and sound alarm monitoring.
Figure 3:
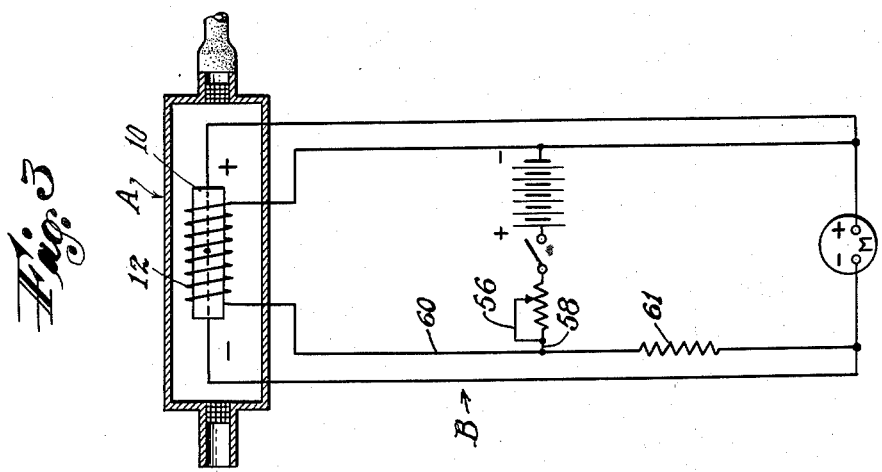
Fig. 3 is also a view similar to Fig. 1 showing still another form of the invention.

Fig. 7 is a wiring diagram showing a further embodiment of the invention, wherein the apparatus may be portable and battery operated, and the counter E.M.F., like in Figs. 4 and 5, is furnished by providing a bias resistance in the thermocouple and a bias control resistance in the thermocouple connected heating circuit; and Figure 8 is a view similar to Figure 3 showing another modification of the invention.

A gas detection and indicating instrument in accordance with the invention, generally, comprises a catalyst and electrical heating means in heat conductive relationship with the catalyst. An electrical power supply is connected to the electrical heating means by a suitable circuit to cause the catalyst to be heated and to support the combustion of a gas or vapor drawn over the catalyst for testing. The catalyst is maintained or initially brought to a desired activating temperature prior to sampling and testing in order to obtain an indication and measurement of temperature rise above the activating temperature caused by the combustion of the particular gas sample being tested. A temperature sensitive element, such as a thermocouple, is disposed in heat exchange relationship with the catalyst and is connected to suitable means for indicating and measuring voltage or current.

To compensate for the activating temperature at the catalyst, and in order to obtain an accurate measurement of temperature rise above the activating temperature, a biased electrical circuit providing a counter E.M.F. is imposed upon the thermocouple to balance its output at the activating temperature. The initial thermocouple output is balanced out so that the measuring meter is zeroed in at the temperature of activation, and as a result, the meter will only indicate rise in temperature above activating temperature. The counter E.M.F. may be furnished by connecting the positive side of the thermocouple to the negative side of a power source, and the thermocouple's negative side to the positive side of the power source. As an alternative, equal and opposite voltages may be placed on the meter circuit to furnish a zero reading by the use of a selected biasing resistance in the meter-connected thermocouple and a bias control resistance in the heating circuit, which is also connected to the thermocouple. In the preferred form of the invention, the source of the counter E.M.F. is the very same power supply which furnishes the energy to heat and support combustion at the catalyst.

In greater detail, a portable form of gas detection and indicating instrument made in accordance with the invention is shown in Fig. 1, and comprises a suitable catalytic mass or catalyst 10 and electrical heating means 12 in heat conductive relationship with the catalyst. A temperature sensitive element, preferably a thermocouple or a pair of conductors 14 and 16 of dissimilar metals, has its hot junction 18 disposed in heat exchange relationship with the catalyst. The catalyst 10, electrical heating means 12, and thermocouple junction 18 are disposed within an otherwise air and gas tight container or cell 20, which is provided at each end with inlet and outlet openings 22 and 24, respectively. Flashback arrestors 26 and 28 are disposed within the inlet and outlet openings. The flash-back arrestors are in the form of discs of fine mesh metal fabric, such as copper screening. The outlet side of the container is also provided with a nipple 30 over which is tightly received the open end of a suitable aspirator or bulb 32. The described elements comprise an analyzer or detector cell or head, generally designated A. When the inlet side of the cell A is placed in an area where it is desired to sample and test the atmosphere for the presence of a combustible gas or vapor, pressing the bulb and allowing it to expand will cause the atmosphere to be drawn into the cell and over the catalyst.

The catalyst 10 is preferably in the form of a cylinder of porous asbestos paper treated with a suitable solution which will support combustion. The solution may be platinum chloride, or a halide solution of palladium, osmium or rhodium, depending upon the type of gases or vapors usually to be encountered for test by the instrument.

The electrical heating element 12, which is preferably in the form of a filament, is helically wound around the outer periphery of the catalyst 10. Any high resistance filament may be used, such as a platinum or Nichrome wire. A D.C. power supply 34, such as a dry battery, is connected to opposite ends of the heating filament by conductors 36 and 38, a switch 40 being provided to close and open the filament and catalyst heating circuit.

The thermocouple conductors 14 and 16 may be of any suitable dissimilar metals, such as platinum to platinum containing rhodium, Chromel to Alumel, iron to constantan, copper to constantan, or Chromel to constantan. The hot junction 18 is preferably disposed within the cylindrically shaped catalyst. The thermocouple conductors are connected to means 42 for measuring voltage or current, such as a millivoltmeter or a milliammeter. The meter preferably is calibrated to indicate the temperature condition at the catalyst in terms of "danger" and "explosive." The negative side of the measuring thermocouple is connected to the negative side of the meter, and the positive side of the thermocouple is connected to the positive side of the meter.

When the switch 40 is closed, current is supplied by the power supply 34 to the heating filament 12 causing combustion to be supported on the catalyst 10. In order to provide a predetermined initial or activating temperature at the catalyst, a variable resistance 44 is provided in the filament heating circuit, such resistance being a one or two ohm rated rheostat. The selected activating temperature, generally within a range of 600 to 1000° F., through the medium of the thermocouple leads 14 and 16, causes an initial deflection of the meter 42.

In order to compensate and zero-in the meter, and thereby measure the rise in temperature between the activating temperature and the temperature of combustion of the particular gas burned at the catalyst, a biased circuit is provided between the power source 34 and the thermocouple leads 14 and 16 to bias or balance out the initial thermocouple output which would otherwise be indicated on the meter. The biased circuit comprises conductors 46 and 48 to connect the positive side of the power supply to the negative side of the thermocouple or lead 14, and the negative side of the power source to the positive side of the thermocouple or the lead 16. Thus, a counter E.M.F. is provided to buck or cancel out the initial output of the thermocouple from the same power source used to supply energy to the catalyst. A resistance 50 is provided in the biased circuit. In the embodiment shown in Fig. 1, such resistance is a fixed resistor of a rating selected to buck or balance out the total output of the thermocouple when the catalyst is at its correct activating temperature. The power supply, the meter, the resistances and the thermocouple leads to the meter may be housed in a suitable cabinet, generally designated B.

In the form of the invention illustrated in Fig. 2, the relationship of the components of the instrument is essentially the same as shown in Fig. 1, except that a fixed resistor 52 of selected rating is provided in the filament and catalyst heating circuit, and a variable resistance or rheostat 54 is located in the biased circuit providing the counter E.M.F. to the thermocouple output at activating temperature.

In the form of the invention illustrated in Fig. 3, the arrangement is the same as shown in Fig. 1, except that a variable resistance or rheostat 56 is located in a line 58 connecting the battery to a conductor 60, which furnishes current to the heating filament and catalyst as well as serving as part of the biased circuit, the biased circuit having a fixed resistor 61 therein.

It will be apparent that a variable resistance may be used in both the heating circuit and the biased circuit, as shown in Figure 8 which is the same as Figure 3 except that the fixed resistor 61 of Figure 3 is replaced by a variable resistor 61a. Where the power source is in the form of a battery, battery "fall-off" to the point where temperature at the catalyst is insufficient, is indicated by using a rheostat in the heating circuit of such selected rating that further compensation or adjustment of the rheostat can no longer be made for the desired operating temperature.

Fig. 4 shows the invention as applied to a continuous monitoring system utilizing a single detecting cell or head A'. The cell includes a catalytic mass or catalyst 62 heated from an A.C. power source, the voltage being stepped down by a transformer 64. The secondary winding is connected to the catalyst by the conductors 66 and 68. A rheostat 70 is provided in the heating circuit to adjust the temperature of the catalyst to the desired operating or activating temperature. A power switch 72 is provided with a white light 74 across the line to indicate when the power is on. Thermocouple leads 76 and 78 provide a hot junction 80 in heat exchange relationship with the catalyst, the opposite or "cold" side of the leads being connected to a meter 82.

The biased circuit to provide a counter E.M.F. to offset the output of the thermocouple at the activating temperature of the catalyst comprises a rectifier 84 connected across the catalyst heating circuit by the conductors 86 and 88. The positive and negative sides of the rectifier are connected to the thermocouple by conductors 90 and 92, both being connected to the thermocouple lead 76 as shown. A condenser 94 is placed across the positive and negative sides of the rectifier. A rheostat 96 is provided in the biased circuit, as in the line 90, to adjust and balance the particular output of the thermocouple at the selected activating temperature. A resistance 98 is provided in the thermocouple lead 76, across the conductors 90 and 92; also, a manganin wire resistance is placed across the conductors 90 and 92, it being understood that other types of resistors may be used.

In the specific embodiment illustrated, the direct current from rectifier 84 is controlled by the rheostat 96, which regulates a D.C. millivoltage across the manganin resistor 100 and resistor 98. The millivoltage across resistors 98 and 100 balances the operating temperature millivoltage in the thermocouple. As indicated on the drawing, low value resistances for 98 and 100 afford the desired balanced condition, or zero reading on the meter at the operating temperature of the catalyst.

As shown in Fig. 4, visual and sound signals may be provided to indicate when a trouble or "blue" condition, and an explosive or "red" condition may exist. Trouble and alarm relays, generally designated 102 and 104, respectively, are connected in series and in the circuit between the meter and the power source. Suitably colored lights and sound devices, as indicated on the drawing, are provided in connection with these relays. The relays are of a construction known in the art, and the details thereof form no part of the present invention. The visual and sound signals are set to initiate an alarm at approximately 20 to 40% of the lower explosive limit of the gas or vapor mixture being analyzed.

To enable periodic testing of the alarm signals, a push button or switch 106 is provided in the biased circuit for the purpose of interrupting or cutting out the biasing circuit. In this manner, the output of the thermocouple at the desired operating temperature is made to pass into the meter, causing an upswing detection which closes the alarm contact, and stimulates a "high gas" or "red" condition. By slightly unbalancing the relay so that it normally rests in the "trouble" or "danger" position, and by regulating the biased circuit, by the rheostat 96, to overcome such slight mechanical offset, a "fail-safe" circuit is obtained. If the thermocouple or heating filament opens up the sensitive relay which is adjusted to a center balance by the adjustment to zero on the meter, there will be a swing down scale to the trouble contact, thereby dropping out the trouble relay and lighting the trouble light. A reset push button or switch 108 is provided in the relay circuit.

The detecting cell A' may be remotely located from the housing or cabinet, designated B', containing the operating components including the transformer, rheostat, rectifier, condenser, biasing circuit, relays and meter. It will, of course, be apparent that this arrangement may be modified to provide a plurality of remotely located detecting cells with each detecting cell having a separate power pack therefor.

In a continuous monitoring arrangement, as shown in Fig. 5, the relationship of the components is essentially the same as shown in Fig. 4, except that a plurality of detecting cells designated $A_a$, $A_b$, $A_c$, $A_d$, are operated from a single power source. In this form of the invention, the catalysts or heating coils are connected in series, as are the thermocouples for each of the catalysts. Heating coils of equal resistance are provided for the detecting cells that the catalysts will all be heated to the same temperature; also, the thermocouple leads are of the same dissimilar materials.

Where the ambient temperature varies over a relatively wide range, for example 30° F. or more, it is desirable to compensate the cold junction or junctions of the thermocouples (where the leads are connected to the meter) to eliminate ambient temperature variations. This may be accomplished by employing a second or compensating thermocouple connected in series and in opposition to the measuring thermocouple. The compensating thermocouple is exposed only to ambient temperature conditions, as distinguished from the temperature of the measuring thermocouple or thermocouples in heating exchange relationship with the catalyst or catalysts.

As shown in Fig. 6, compensation for ambient temperature may be obtained by providing a compensating thermocouple 110 in opposition to a measuring thermocouple 112, the measuring thermocouple being located in heat exchange relationship with a catalyst 114 heated by a filament 116. The components are preferably related to each other by a common mounting plate 117 having posts 118 and 120 for connection to the ends of the heating filament, a post 122 for connection of one side of the measuring thermocouple, and a post 124 for connection to an end of the compensating thermocouple. This arrangement for compensating for variations in ambient temperature may be used in combination or in conjunction with any one of the previously described embodiments of the invention for gas detection and indication.

In the form of the invention illustrated in Fig. 7, the provision of the biased circuit or the manner of applying a counter E.M.F. to the thermocouple to balance its output at the desired operating or activating temperature as exemplified in the forms of the invention illustrated in Figs. 4 and 5, is shown as applied to a portable or battery-powered unit. A heating filament 126 is located in heat-conductive relationship with a catalyst 128. A thermocouple having a hot junction 130 is disposed in heat exchange relationship with the catalyst. The thermocouple leads 132 and 134 are connected to the meter 136. The catalyst, the heating filament and the thermocouple junction are disposed within a cell, designated A'', as previously described. The heating filament is connected to a D.C. power supply or battery 138 by the conductors 140 and 142, a switch 144 being provided to close and open the heating circuit. A variable resistance or rheostat 146 to adjust the voltage is provided in the heating circuit.

The heating circuit is connected to the lead 132 of the thermocouple circuit at 150 through a bias control resistance 141. The opposite or the negative side of the battery is also connected to the same side of the thermocouple, or lead 132, by a conductor 152 at 154. A bias resistance 156, which may be a fixed resistor, is located between the connections 150 and 154. Thus, the biased circuit comprises a bias resistance 156 in one side of the thermocouple and the bias control resistance 141 between the power supply and the same side of the thermocouple to regulate the voltage across resistance 156, and thereby balance the output of the thermocouple and zero-in the meter.

The various and related polarities of the components, and the ratings of the resistances for a 1.5 volt battery may be as shown in the Figure 7. It will be understood, of course, that with a battery of different voltage, the resistances would be commensurately changed. Assuming that there is a thermocouple output of 40 millivolts across the thermocouple leads 132 and 134 at desired operating temperature, a counter E.M.F. of 40 millivolts may be provided across the bias resistor 156 to zero-in the meter by adjusting the variable resistance 146 so that the battery delivers 1.0 volt to the heating circuit, there being a voltage of approximately .960 volt across the 25 ohm bias control resistor 141. With the two equal and opposite voltages in the circuit to the meter, the meter reading is zero at the operating temperature of the catalyst. When analyzing a gas in the cell A'', and with an increase in temperature at the thermocouple junction 130, the consequent unbalanced condition causes the meter to directly indicate the increase in temperature.

The means for providing compensation for ambient temperature, as shown in Fig. 6, may be used in combination or conjunction with the form of the invention illustrated in Fig. 7.

It is believed that the advantages of the invention as hereinbefore described will be apparent from the foregoing detailed description. While the invention has been described in several preferred forms, changes may be made without departing from the spirit and scope of the invention as sought to be defined in the following claims.

We claim:

1. In apparatus for detecting and indicating a combustible gas or vapor comprising a catalyst, electrical heating means in heat conductive relationship with the catalyst, an electric power supply connected to said heating means, a thermocouple in heat exchange relationship with the catalyst, and indicating means connected to the thermocouple to measure the degree of combustion at the catalyst, the improvement comprising an electrical biased circuit connected to the thermocouple including said power supply and a resistance to provide a counter E.M.F. and balance and zero the thermocouple E.M.F. at the activating temperature of the catalyst, thereby indicating temperature rise above activating temperature on said indicating means.

2. In apparatus for detecting and indicating a combustible gas or vapor comprising a catalyst, electrical heating means in heat conductive relationship with the catalyst, an electric power supply connected to said heating means, a thermocouple in heat exchange relationship with the catalyst, and indicating means connected to the thermocouple to measure the degree of combustion at the catalyst, the improvement comprising a biased circuit between the power supply and the thermocouple and including a resistance to provide a counter E.M.F. and balance and zero the E.M.F. of the thermocouple at the activating temperature of the catalyst, thereby indicating temperature rise above activating temperature on said indicating means.

3. In apparatus as set forth in claim 2, wherein the positive and negative sides of the power supply are respectively connected to the negative and positive sides of the thermocouple.

4. In apparatus as set forth in claim 2, wherein the biased circuit comprises a bias resistance in a side of the thermocouple, and a bias control resistance is provided between the power supply and said side of the thermocouple.

5. In apparatus for detecting and indicating a combustible gas or vapor comprising a catalyst, electrical heating means in heat conductive relationship with the catalyst, an electric power supply connected to said heating means, a measuring thermocouple in heat exchange relationship with the catalyst, and indicating means connected to said thermocouple to measure the degree of combustion at the catalyst, the improvement comprising a biased circuit between the power supply and said measuring thermocouple including a resistance to provide a counter E.M.F. and balance and zero the thermocouple E.M.F. at the activating temperature of the catalyst, thereby indicating temperature rise above activating temperature on said indicating means, and means to compensate for variations in ambient temperature comprising a compensating thermocouple exposed to ambient temperature and connected in series with said measuring thermocouple.

6. In apparatus as set forth in claim 5, wherein the positive and negative sides of the power supply are respectively connected to the negative and positive sides of the measuring thermocouple.

7. In apparatus as set forth in claim 5, wherein the biased circuit comprises a bias resistance in a side of the measuring thermocouple, and a bias control resistance is provided between the power supply and said side of the thermocouple.

8. In portable apparatus for detecting and indicating a combustible gas or vapor comprising a catalyst, electrical heating means in heat conductive relationship with the catalyst, a battery connected to said heating means, a thermocouple in heat exchange relationship with the catalyst, and indicating means connected to the thermocouple to measure the degree of combustion at the catalyst, the improvement comprising a biased circuit including a variable resistance between the battery and the thermocouple to provide a counter E.M.F. and balance and zero the E.M.F. of the thermocouple at the activating temperature of the catalyst, thereby indicating temperature rise above activating temperature on said indicating means, and a variable resistance provided between said electrical heating means and the battery, said variable resistance having a selected rating limiting further adjustment when the battery output falls below the desired operating temperature at the catalyst.

9. Apparatus for continuously monitoring for the presence of a combustible gas or vapor comprising a catalyst, electrical heating means in heat conductive relationship with the catalyst, an A.C. power supply connected to said heating means, a thermocouple in heat exchange relationship with the catalyst, indicating means connected to the thermocouple to measure the degree of combustion at the catalyst, and a biased circuit including a rectifier connected to the power supply and the thermocouple, said biased circuit including a resistance and providing a counter E.M.F. to balance and zero the output of the thermocouple at the activating temperature of the catalyst, thereby indicating temperature rise above activating temperature on said indicating means.

10. In apparatus as set forth in claim 9, wherein the bias circuit comprises a bias resistance in a side of the thermocouple, and a bias control resistance is provided between the rectifier and said side of the thermocouple.

11. Apparatus for continuously monitoring for the presence of a combustible gas or vapor comprising a catalyst, electrical heating means in heat conductive relationship with the catalyst, an A.C. power supply connected to said heating means, a variable resistance between the electrical heating means and the power supply for adjustment of the temperature at the catalyst to a predetermined degree, a thermocouple in heat exchange relationship with the catalyst, indicating means connected to the thermocouple to measure the degree of combustion at the catalyst, a biased circuit including a rectifier connected to the power supply and the thermocouple, said biased circuit including a resistance and providing a counter E.M.F. to balance and zero the E.M.F. of the thermocouple at the activating temperature of the catalyst, thereby indicating temperature rise above activating temperature on said indicating means, said biased circuit including a bias resistance in a side of the thermocouple, and a bias control resistance provided between the rectifier and said side of the thermocouple.

12. Apparatus as set forth in claim 11, wherein the thermocouple is connected in series to a second thermocouple exposed to ambient temperature.

13. Apparatus as set forth in claim 11, wherein a trouble relay and an alarm relay, each having visual and sound signals, are connected in series and between the power supply and the indicating means, a test switch being located in the biased circuit, and a reset switch in the relay circuit.

14. Apparatus as set forth in claim 11, wherein the catalyst, the electrical heating means and the thermocouple comprise one of a plurality of detecting cells, the electrical heating means of the cells being equal in resistance and connected in series, and the thermocouples of the cells being of the same dissimilar metals and connected in series, the plurality of detecting cells being operated from said power supply.

15. Apparatus as set forth in claim 11, wherein a trouble relay and an alarm relay, each having visual and sound signals, are connected in series and between the power supply and the indicating means, a test switch being located in the biased circuit, and a reset switch in the relay circuit; wherein the catalyst, the electrical heating means and the thermocouple comprise one of a plurality of detecting cells, the electrical heating means of the cells being equal in resistance and connected in series, and the thermocouples of the cells being of the same dissimilar metals and connected in series, the plurality of detecting cells being operated from said power supply; and wherein the thermocouples are connected in series to another thermocouple exposed to ambient temperature to compensate for variations in ambient temperature.

References Cited in the file of this patent

UNITED STATES PATENTS

| Re. 16,270 | Varley | Feb. 16, 1927 |
| 2,073,249 | Morgan et al. | Mar. 9, 1937 |
| 2,083,521 | Miller | June 8, 1937 |
| 2,234,128 | Miller | Mar. 4, 1941 |

FOREIGN PATENTS

| 602,570 | France | Dec. 25, 1925 |

OTHER REFERENCES

Taylor, Jr.: "Instrumentation," 5, 35, 36 (1952).